United States Patent
Mac Farland

(10) Patent No.: US 6,796,597 B2
(45) Date of Patent: Sep. 28, 2004

(54) RETRACTABLE HARD TOP WITH INBOARD CONNECTIONS

(75) Inventor: David P. Mac Farland, Unterschleissheim (DE)

(73) Assignee: Dura Convertible Systems GmbH, Kolin (DE)

( * ) Notice: Subject to any disclaimer, the term of this patent is extended or adjusted under 35 U.S.C. 154(b) by 0 days.

(21) Appl. No.: 10/353,665

(22) Filed: Jan. 29, 2003

(65) Prior Publication Data

US 2004/0145212 A1 Jul. 29, 2004

(30) Foreign Application Priority Data

Jan. 29, 2002 (EP) .............................................. 02002182

(51) Int. Cl.[7] .................................................. B60J 7/08
(52) U.S. Cl. .............. 296/108; 296/107.15; 296/107.17
(58) Field of Search ........................ 296/107.08, 107.07, 296/107.11, 107.15, 107.16, 107.17, 108

(56) References Cited

U.S. PATENT DOCUMENTS 135,201 A     1/1873   Burdon
6,336,673 B1 *  1/2002  Rothe et al. ........... 296/107.17
6,390,532 B1 *  5/2002  Mac Farland .......... 296/107.17
6,422,637 B1 *  7/2002  Mac Farland .......... 296/107.15
6,511,118 B2 *  1/2003  Liedmeyer et al. .... 296/107.17
2002/0135201 A1 * 9/2002 Liedmeyer et al. .... 296/107.17

FOREIGN PATENT DOCUMENTS

DE    299 13 486 U    12/2000
EP    1 092 579 A     10/1999
EP    1 092 580 A     10/1999

* cited by examiner

Primary Examiner—Patricia L. Engle
(74) Attorney, Agent, or Firm—McDonald Hopkins Co. LPA

(57) ABSTRACT

A retractable hard top for convertibles, in particular for four-seated convertibles, includes, sequentially, a first, front section, a second section, a third section and a fourth, rear section. Each section has a front, first edge portion and a rear, second edge portion. The first and the second sections substantially form the roof ceiling in the closed position of the hard top, while the third section forms the C-pillar and includes the backlite. The sections are pivotally connected by a linkage which compactly folds the top for storage in a storage compartment. All three sections are inverted and nest within one another, with their respective first edge portions being positioned in the longitudinal vehicle direction behind the second edge portions.

7 Claims, 5 Drawing Sheets

RETRACTABLE HARD TOP WITH INBOARD CONNECTIONS

BACKGROUND OF THE INVENTION

Field of the Invention

The present invention refers to a retractable hard top for a convertible and, in particular, to such a top for a four-seated convertible.

Since convertibles are increasingly used as all-season vehicles, hard tops have significant advantages regarding ruggedness, resistance against snow load, susceptibility to wind, and noise pollution in the interior of the motor vehicle compared to conventional vehicle soft tops, which consist of lateral bows covered with cloth. Hard tops of this type are normally installed when the soft top is lowered in the winter, and are taken off and stored at a separate location when the weather is warmer. However, currently there is a trend toward replacing the soft top with a retractable hard top. These retractable hard tops operate in a similar manner as a soft top: are folded backwards and are retracted and extended by means of a power operator located in a top storage compartment located in or adjacent the vehicle trunk. In these, the top is divided into two sections, which fold in a clamshell arrangement for storage. These tops are used in two seat convertibles and are bulky, and are unsuitable for four-seat convertibles.

A known retractable hard top is disclosed in European Patent Application EP 1 092 579 A1, and comprises three roof sections or shells. When pivoting the top from an unfolded, extended roof position into a retracted, stored position, the second, central roof section moves into the rear roof section and at the same time the first, front roof section moves over the second, central roof section, and along this roof section and subsequently between the second, central roof section and the rear roof section in the folded condition. The outside surfaces of the three roof sections rest upside down, with the first roof section located between the second and the third roof sections.

It would be desirable to provide a retractable hard top, which is suitable for large motor vehicles, in particular for four-seat convertibles and which provides a large space in the interior of the passenger compartment and still enables a trouble-free retraction process and takes relatively little space in the retracted condition.

SUMMARY OF THE INVENTION

This invention features a three section hard top in which the first, second and third sections are pivotally connected to each other via hinge brackets arranged in the area of the roof center, symmetrically about the vehicle centerline, between the outer portions of the hard top. This arrangement provides a great ruggedness of the hard top against snow load, a great stability of the mechanical guide and also provides good leverage due to the arrangement of this centrallinks at a low height.

It is advantageous with respect to reliability that the first, second and third sections are connected through a plurality of hinge brackets symmetrically arranged at the two outer portions of the hard top and pivotally connected with one another.

Longitudinal slots are provided in the second section in the outer portions and in the area of the roof center. These slots enable passage of the hinge brackets therethrough during the folding and unfolding of the hard top, which enables the first section to easily move over the second section.

In the rear edge portion of the first section, longitudinal slots are arranged in the outer portions and in the area of the roof center as well as in the front edge portion of the third section in the outer portions. These slots enable the passage of the hinge brackets during the folding and unfolding of the hard top, which further increases compactness of the hard top in the retracted position.

The hard top preferably includes a flexible outer fabric cover, made of any conventional soft top convertible cover material, which is secured to the first and third sections. This covers the transverse slots in the transitional area between two roof sections and the longitudinal slots in the vehicle roof area in a water-proof manner, and provides an aesthetically pleasing overall impression.

During the folding of the hard top, the first, front section moves over the second section and subsequently between the second section and the third section, which reduces the overall height of the hard top during the folding process.

Further objects, details, features and advantages of the invention can be derived from the following description with reference to the drawings, wherein:

DESCRIPTION OF THE DRAWINGS

FIG. 3 is a schematic side view of the fully retracted hard top of FIG. 1a; and

DETAILED DESCRIPTION OF THE INVENTION

Figure 1A:
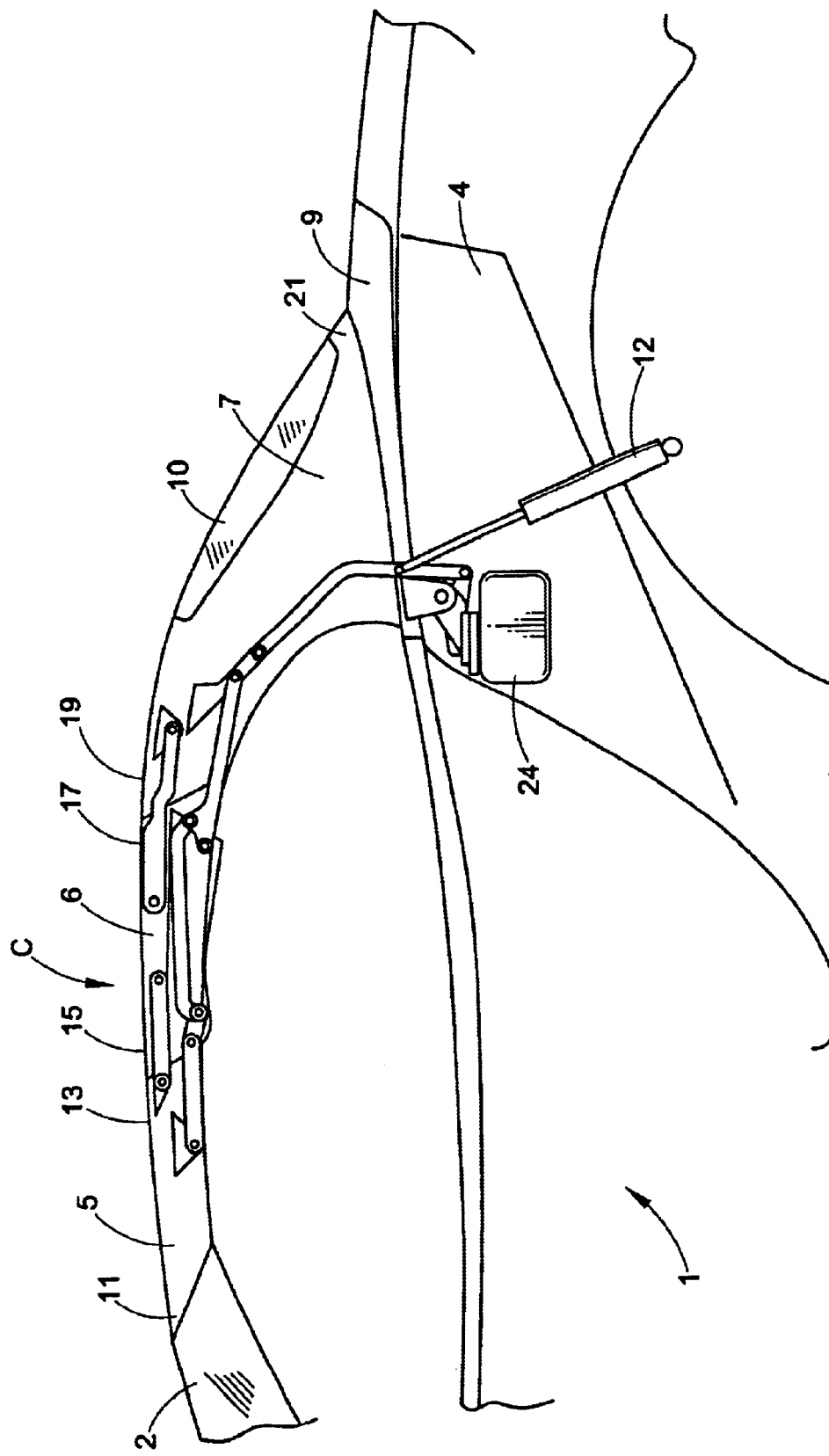
FIG. 1a is a schematic side view of a retractable hard top according to this invention, shown in the closed condition.

FIG. 1a shows a motor vehicle 1 in the form of a convertible, which has a large passenger compartment. The motor vehicle 1 has a windshield 2, a retractable hard top 3 to cover the passenger compartment of the convertible and a storage compartment 4 in which the retracted and folded hard top is stored. The convertible is in the present case is illustrated as a very spacious two-seated vehicle, although the hard top according to this invention is also well suited for four-seat convertibles.

The hard top 3, which is shown in FIG. 1a in the unfolded position, has three rigid roof sections or shells. The first front section 5 and the adjoining second, central section 6 form substantially all the roof ceiling of the passenger compartment of the motor vehicle. The third rear section 7 extends rearwardly from the back of the second section 6 to forms the C-pillar of the convertible and, at the same time, closes the rear of the passenger compartment. In the illustrated embodiment, a rear window or backlite 10 is integrated in the third rear section 7. The storage compartment 4 is closed towards the top by a tonneau 9 in a well-known manner. A conventional latch receiver (not shown) is provided on the upper edge of the windshield 2, and receives a locking means (not shown) mounted adjacent the front edge of the front section 5 of the hard top 3. The hard top sections each have a respective front, first edge portion 11, 15 and 19, and a respective rear, second edge portion 13, 17 and 21.

Figure 1B:
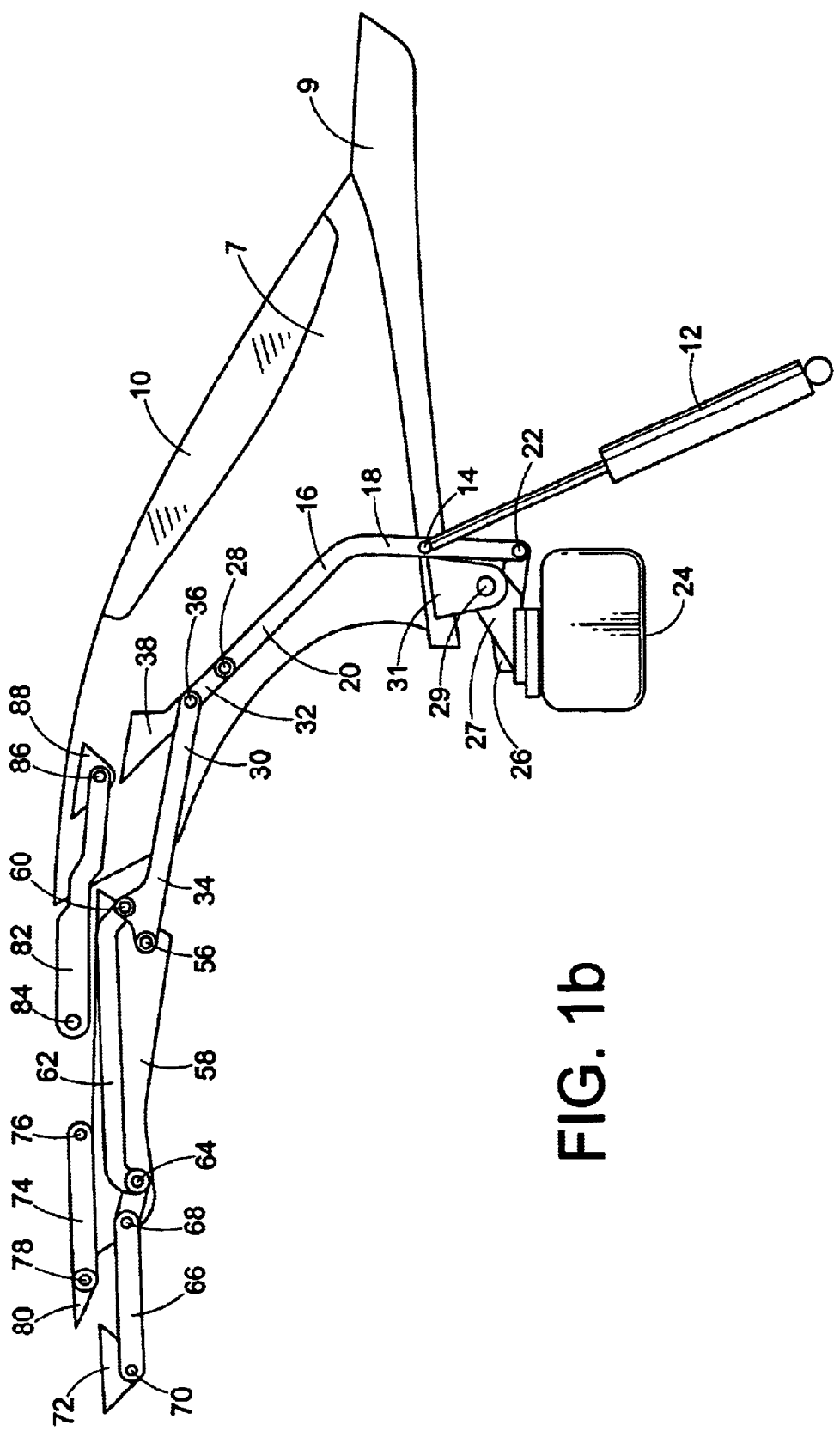
FIG. 1b is a view similar to FIG. 1a, but with further chassis elements removed and the first three sections of the hard top are not shown for clarity.
Figure 2:
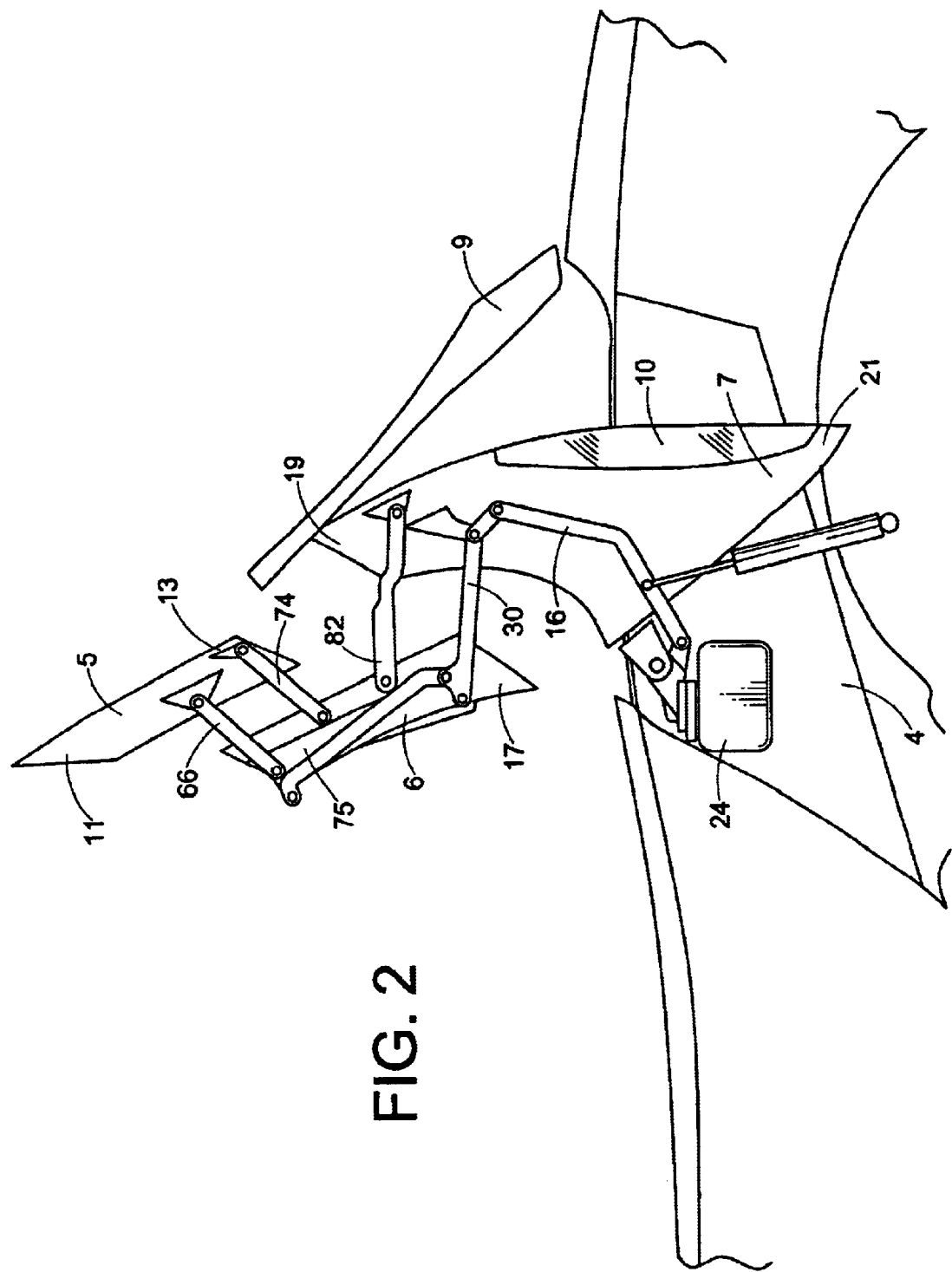
FIG. 2 is a schematic side view of the hard top of FIG. 1a in a semi-opened position.
Figure 3:
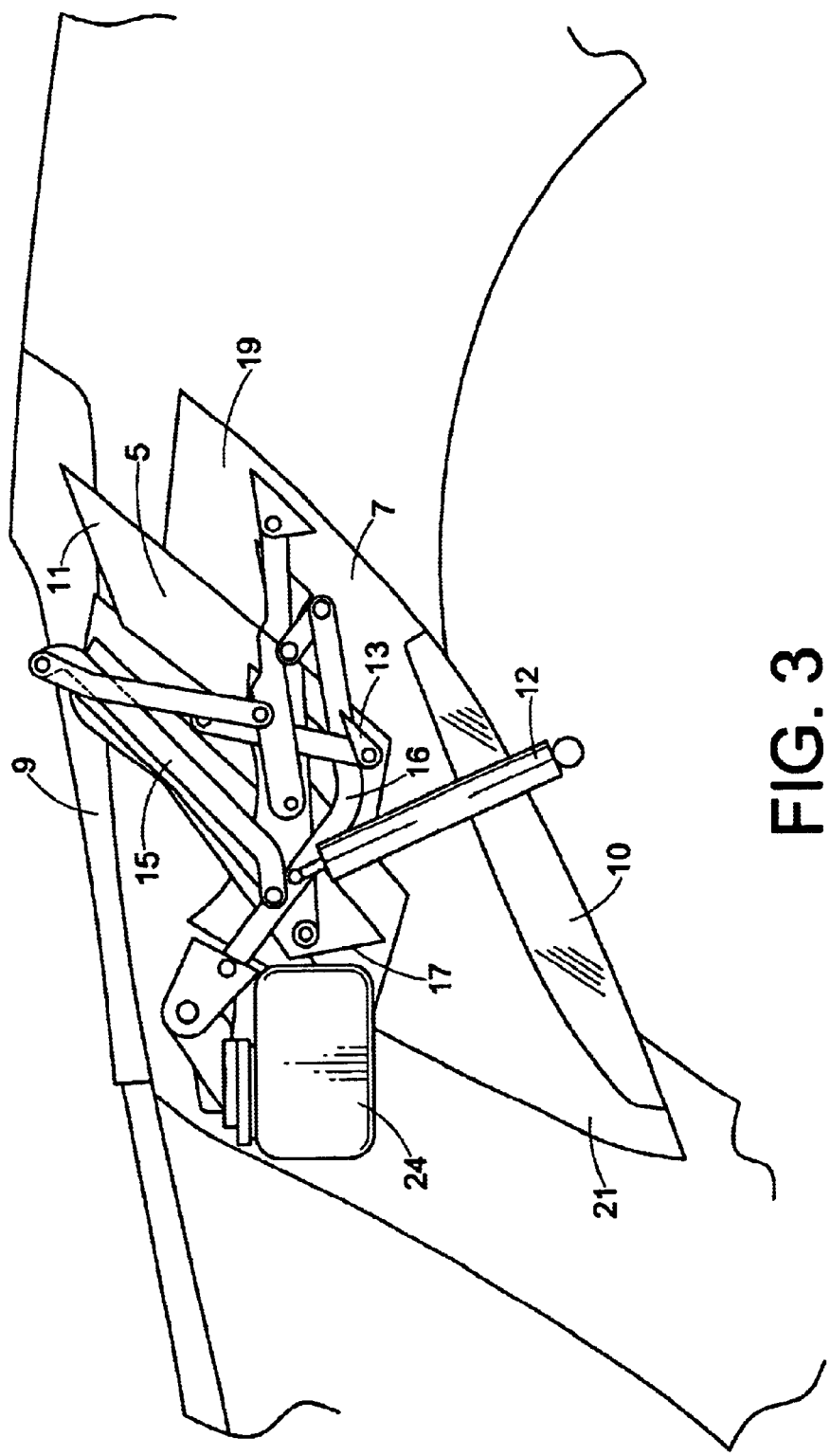

The structure and the arrangement of the pivotal connections of a preferred embodiment of the hard top according to the invention can best be seen in FIG. 1b, where, for reasons of clarity, roof sections 5 and 6 are not shown. Otherwise, all mechanical components are provided in detail with reference numerals. In FIGS. 2 and 3, only some of the mechanical main components are illustrated with reference numerals for reasons of clarity.

A hydraulic cylinder 12 is mounted in the storage compartment 4, to power the entire hard top 3 between folded and unfolded conditions, according to the invention. The hydraulic cylinder 12 is pivoted to the main bracket 16 of the third roof section 7 at pivot point 14 and retracts to pull this roof section obliquely backwards and down during folding of the hard top. The main bracket 16 has an angular shape with two legs. The lower leg 18 includes pivot point 14 and is arranged substantially perpendicularly in the folded position of the hard top. The somewhat longer upper leg 20 is angled transversely towards the front top. The lower end of lower leg 18 is pivoted at 22 to the rear end of a rigid bearing bracket 26 which extends horizontally rearwardly from body-attached mounting block 24.

A bearing bracket 27 projects from the mounting block 24 obliquely in the rear top direction. On its upper end bracket 27 is pivoted to connection member 31 at pivot point 29; the connection member is secured to the lower portion of the third roof section 7.

The upper end of the upper leg 20 of main bracket 16 is pivotally connected at 28 to the angular forwardly-extending angular link 30. The link 30 has a short lower leg 32 extending parallelly with respect to the upper leg 20 of the main bracket 16, and a horizontally aligned long upper leg 34. In the angular transitional portion between the two legs 32 and 34, a short connection link 38 first of all arranged in coupling point 36 parallel to the lower leg 32 is attached, said short connection bracket being fixedly connected at its upper end to the third roof section 7.

On the front end, the upper leg 34 of the hinge bracket 30 is movably connected at pivot point 56 to the shell-shaped inset 58, which is attached in the second roof section 6 by any suitable means, such as by gluing. In a bulging of the upper leg 34, said bulging not being remote from the pivot point 56, Leg 34 is pivotally connected to a further bracket 52 in pivot point 60. This bracket 62 has a generally U-shape, with the two short legs projecting downwardly, and the connecting long central section extends essentially horizontally. On the leg opposite pivot point 60 the other leg has a pivot point 64 that provides a pivotal connection to the front bracket 66. The shape and arrangement of the front bracket 66 is very similar to the angular hinge bracket 30, although it is pivotally connected to the shell-shaped inset 58 in the angular transitional portion between its two legs in pivot point 68. On its front end, front bracket 66 is pivotally connected to the connection member 72 at pivot point 70; Member 72 is fixedly connected to the first hard top section 5. It is also contemplated to eliminate the shell-like inset and mount then the pivot points integral with the second roof section 6.

All previously described elements are symmetrically arranged at both longitudinal sides of the vehicle, although in side view only one side can be shown.

In the hard top system according to the invention, a further pivotal connection exists between the two front hard top sections, which are arranged more in the vehicle center, i.e. between the heads of driver and passenger. A first mounting bracket 74 is pivotally connected in the pivot point 76 to the second hard top section 6 and extends from there substantially parallelly to it in a straight line forwardly, where it is pivotally connected at pivot point 78 to the connection member 80, which in turn is fixedly connected to the first hard top section 5.

The connection between the second and the third roof section is provided by the connection bracket 82, which also extends almost horizontally and which is pivotally connected to the second hard top section 6 at its front end at pivot point 84. At its rear end, the connection bracket 82 is pivotally connected to the connection member 88 at pivot point 86, and is fixedly mounted to the third hard top section 7. As already mentioned, the two connection brackets 74 and 82 are arranged rather in the vehicle center. For reasons of symmetry and construction they also exist in double version at symmetrical distances from the vehicle center. As may naturally be derived from the slightly convex shape of the hard top sections, the two brackets 74 and 82 are clearly elevated higher than the remaining brackets extending on the longitudinal sides of the motor vehicle, which leads to some advantages for the top mechanism. Due to the difference in height, a greater lever effect can be achieved, without restricting the head freedom of the passengers of the convertible, as was formerly required when placing the brackets also on the longitudinal sides of the vehicle. Moreover, the central brackets 74 and 82 support the hard top sections in the case of a high snow load in winter and are responsible for an even stronger stability and ruggedness of the top construction and for a better guide in the relative pivoting of the sections during the folding and unfolding processes.

The mode of operation to unfold the retractable hard top 3 will now be explained with particular reference to FIGS. 1a, 2 and 3.

FIG. 3 shows the folded position of the hard top 3 according to the invention. In FIG. 2, the elevation of the first hard top section 5 is caused by the extension of the hydraulic cylinder 12 and the above described constructive mechanical design of the links, the upward pivot process of the hard top section can be supported upwardly additionally by already known support mechanisms within the framework of a cylinder locking device or other holding means.

It can clearly be seen in FIG. 2 that the tonneau 9 of the storage compartment 4 has moved upwards sufficiently far to enable the lowering process of the hard top 3 into the storage compartment 9. The two front hard top sections 5 and 6 are now lowered backwards downwards simultaneously to the hard top section 7, wherein the front section 5 first of all moves over the lowering second section 6 and subsequently moves between the second section 6 and the third section 7. This simultaneous movement is caused by the operation of the hydraulic cylinder only, which in the present mechanical construction leads to the movement of the individual roof section in particular via an interaction of main bracket 16, link 30, bracket 62 and front bracket 66 and via the two central links 74 and 82.

As may best be seen in FIG. 3, the three hard top sections are in the final folded position in a nested condition, wherein the section first edge portions 11, 15, and 19, respectively, are now located rearwardly behind the respective second edge portions 13, 17, and 21, longitudinally of the vehicle. The movement of the individual hard top sections basically resembles a rotation about a variety of moved pivot axes extending transversely of the vehicle in the area of the mounting bracket around which axes the individual section move into the storage compartment, wherein they are inverted.

It can also be seen from FIGS. 2 and 3 that the central links 74 and 82 and the lateral front brackets 66 and the link 30 must pass through the second hard top section 6 during the folding-in movement of the hard top 3, in order to make the mechanism shown applicable and operative.

Figure 4:
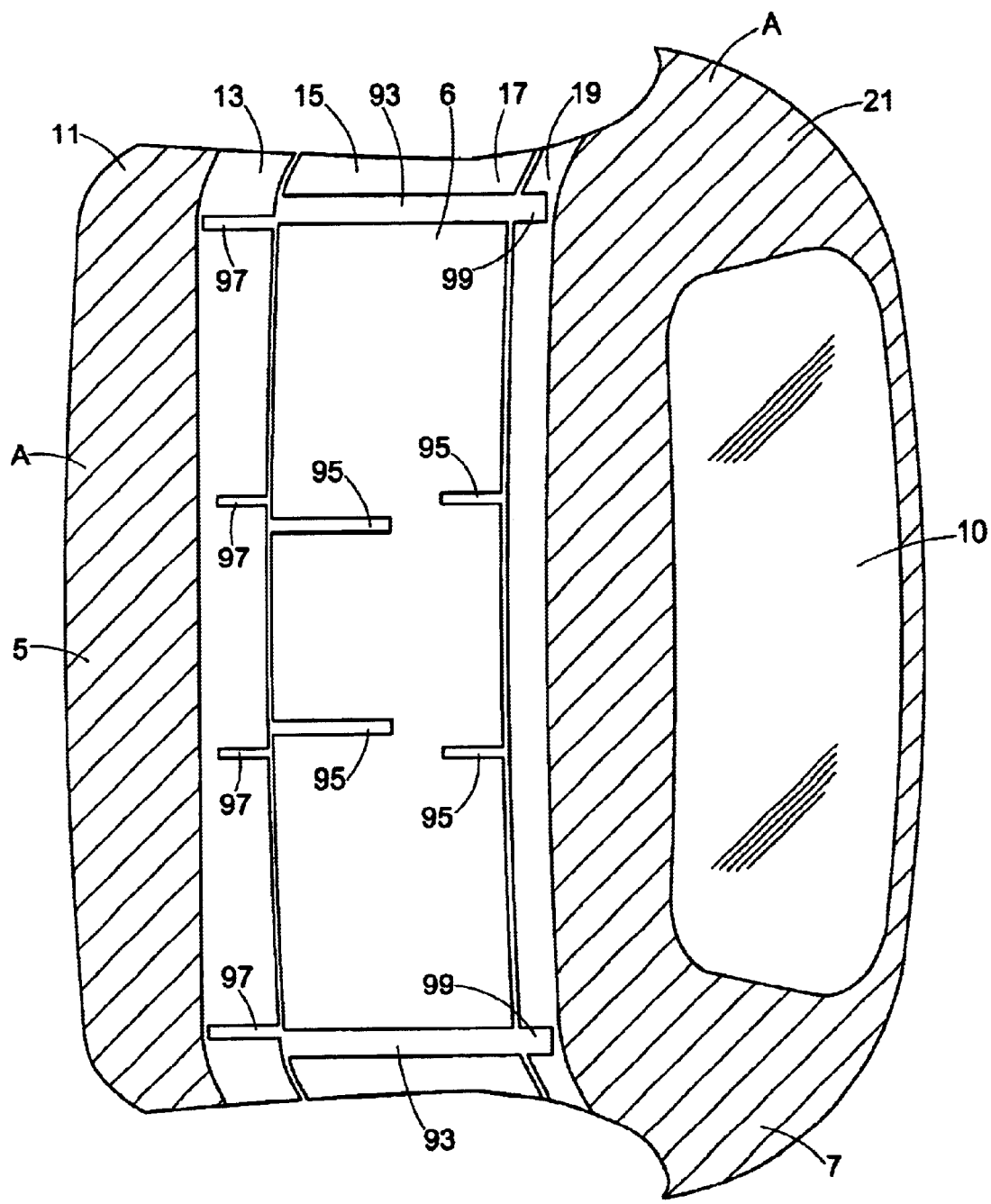
FIG. 4 is a top plan view of the retractable hard top according to the invention, shown without hardware and in unfolded condition to illustrate the attachment of the fabric covering.

As shown in FIG. 4, longitudinal slots are arranged in the second roof section 6 which enable the respective links to pass through the roof sections during folding and unfolding movement. In the outboard portion of the roof sections, continuous longitudinal slots 93 are formed to enable passage of the front brackets 66 and the links 30. In the area of the roof center, further longitudinal slots 95 are provided to enable passage of the connection links 74 and 82. To attain a trouble-free operation and an optimization of the mechanism and to achieve a minimal space requirement in the open position of the hard top, further longitudinal slots 97 are arranged in the rear edge portion 13 of the first hard top section 5 and in the outer portions as well as in the area of the roof center and in the front edge portion 19 of the third hard top section 7.

In order to cover the slots in the roof section, a cover C is glued onto large areas A of the first, and third roof sections. An example for the surfaces on which the foil is glued is shown by hatched portions A in FIG. 4. The cover C is not attached to the second section 6, but is pulled tautly over it when the top is fully extended in raised condition. This provides a weather-tight seal for the entire top, the slots and lateral joints between the sections included.

Thus, a construction is provided by the hard top system according to the invention, which can also be used in vehicles having a large passenger compartment and which is stable, robust and reliable and requires relatively little when retracted.

I claim:

1. A retractable hard top for a convertible having a windshield, a body, a top storage compartment in the body closed by a tonneau, said hardtop being movable between an extended unfolded condition covering a passenger compartment and a folded, stored condition in the top storage compartment comprising:

a first front section, which is adapted to be connected to an upper edge portion of the windshield, a second central section adjoining the first section when the hard top is unfolded, and a third rear section adjoining the second section, wherein each section has a front first edge portion and a rear second edge portion, wherein the first and the second sections substantially cover the passenger compartment when the top is unfolded, and the third section forms the convertible body C-pillar and closes the upper portion of the passenger compartment towards the back, and pivot means pivotally interconnecting the sections for folding into a compact folded condition for storage, and for unfolding into an unfolded condition covering the passenger compartment, wherein the pivot means interconnect the sections for movement backwardly downwardly when folding the top, so that in the folded position the three sections are nested within one another, with their respective first edge portions being positioned in the longitudinal vehicle direction behind the second edge portions, wherein the first, second and third sections are pivotally connected via a plurality of hinge brackets arranged symmetrically at the two outer portions of the hard top, and wherein the first, second and third sections are additionally pivotally connected by a plurality of hinge brackets arranged in longitudinal vehicle direction in the area of the roof center between the two outer portions of the hard top.

2. A hard top as claimed in claim 1, wherein first longitudinal slots are arranged in the second section in the outer portions and in the area of the roof center, said slots for enabling passage of hinge brackets therethrough during folding and unfolding of the hard top.

3. A hard top as claimed in claim 2, wherein second longitudinal slots are arranged in the second edge portion of the first section in the outer portions and in the area of the roof center for enabling passage of the pivotal connections therethrough during folding and unfolding of the hard top.

4. A hard top as claimed in claimed 3, wherein third longitudinal slots are arranged in the first edge portion of the third section in the outer portions, said slots enabling passing hinge brackets therethrough during folding and unfolding of the hard top.

5. A hard top as claimed in claim 1, further comprising a flexible cloth cover connected to the first and third sections and overlying all sections in the unfolded condition of the hardtop.

6. A hard top as claimed in claim 1, wherein the first front section moves during folding between the second section and the third section.

7. A hard top as claimed in claim 6, further comprising a rear window integrated into the third section.

* * * * *

UNITED STATES PATENT AND TRADEMARK OFFICE
CERTIFICATE OF CORRECTION

PATENT NO. : 6,796,597 B2
DATED : September 28, 2004
INVENTOR(S) : David P. MacFarland It is certified that error appears in the above-identified patent and that said Letters Patent is hereby corrected as shown below:

Column 6,
Line 36, replace the second occurance of "claimed" with -- claim --

Signed and Sealed this

Twenty-ninth Day of March, 2005

JON W. DUDAS
*Director of the United States Patent and Trademark Office*